Aug. 26, 1958

L. H. RIKKEN 2,849,260

BEARING FOR WEIGHING SCALES

Filed Feb. 9, 1956

INVENTOR:
LEONARDUS HENRICUS RIKKEN
BY
Margall, Johnston, Cook & Root.
ATT'YS

United States Patent Office 2,849,260
Patented Aug. 26, 1958

2,849,260

BEARING FOR WEIGHING SCALES

Leonardus Henricus Rikken, Rotterdam, Netherlands, assignor to U. S. Slicing Machine Company, Inc., La Porte, Ind., a corporation of Indiana Application November 9, 1955, Serial No. 545,899

Claims priority, application Great Britain November 25, 1954

7 Claims. (Cl. 308—2)

This invention relates to a knife-edge bearing for measuring instruments, such as weighing scales. The bearing for the knife-edge comprises a plurality of independently movable knife-edge supporting members, each of which has a supporting surface occupying a plane which is tangent to the knife-edge. The bearings are disposed pairwise at different angles, so that an essentially V-shaped trough is formed.

The invention comprises, in general, independently movable knife-edge supporting means, each of which comprises a stem which is perpendicular to the tangent plane with the knife-edge on the side of the supporting means remote from the knife-edge. This arrangement is such that a compressive force will be exerted on the supporting means. Each of the stems possesses such a ratio between its length and diameter that the supporting means are free to adjust themselves in all directions.

The knife-edge bearing of the type to which this invention relates is disclosed in the specification of British Patent No. 338,848. The construction disclosed in that specification discloses two cooperating knife-edge supporting means which are arranged in juxtaposition to form the knife-edge bearing, the knife-edge supporting means being suspended from leaf springs. This arrangement discloses a V-shaped trough, but the trough is closed overhead. Therefore, that arrangement in the mounting of the knife-edge has proved very troublesome. That construction has a disadvantage in that the tilting of the supporting means about an axis which is at an angle to the knife-edge is impossible.

The primary object of the present invention is the provision of a new and improved knife-edge bearing which is very sensitive, is simple in construction, and its functioning can not be adversely influenced by dirt or other foreign matter.

Another object of the invention comprises a novel knife-edge bearing embodying a plurality of independently movable knife-edge supporting means, each of which is disposed pairwise at different angles to form an essentially V-shaped trough which is flexibly supported from beneath and resting upon the base or other part of the weighing mechanism.

Numerous other objects and advantages will be apparent throughout the progress of the specification which follows.

Figure 1:
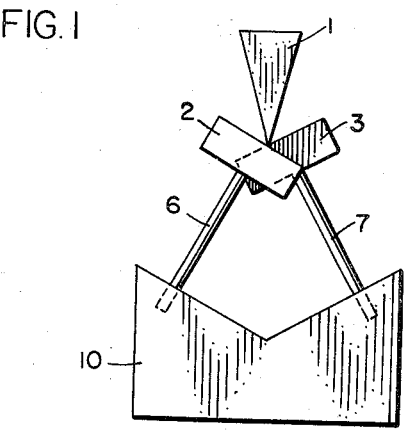
Figure 2:
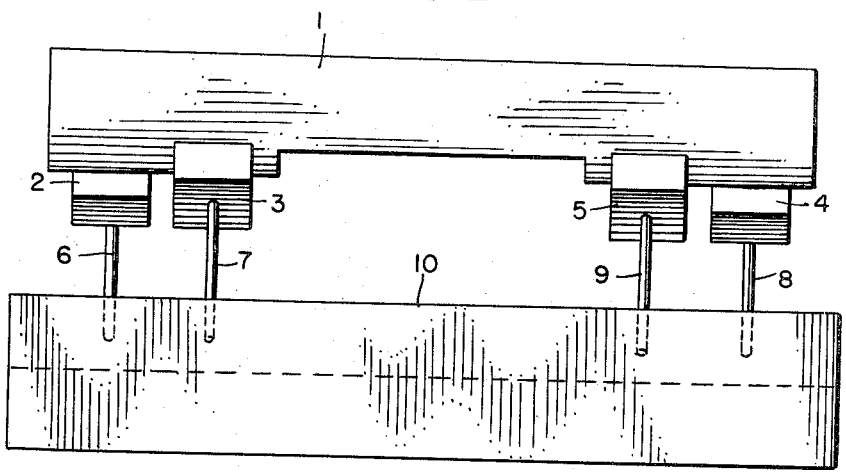

Fig. 1 is a detail front elevational view of an instrumentality and embodying the invention; and Fig. 2 is a side elevation thereof.

The particular construction herein disclosed for the purpose of illustrating the invention comprises a knife or knife-edge bearing 1 which is adapted to be attached to the base of a weighing mechanism (not shown). The knife or knife-edge bearing 1 rests in a V-shaped trough which is formed by the top surfaces of bearing plates 2, 3, 4 and 5. These bearing plates are positioned pairwise in the same plane, the plane containing the top surfaces of the plates 2 and 4 which intersect a plane containing the top surfaces of the plates 3 and 5. Both planes are tangent to the knife-edge 1.

A bore is provided centrally in the bottom side of each of the bearing plates 2, 3, 4 and 5. The upper end of resilient stems 6, 7, 8 and 9 respectively are pressed into each bore. The stems 6, 7, 8 and 9 are preferably circular in cross section, and may consist of lengths of piano wire. The lower ends of the stems 6, 7, 8 and 9 are mounted in bores in the oblique surfaces of an instrumentality support 10, such as the base of a weighing scale.

The stems 6 to 9 are stressed due to axial compression and generally due to bending forces. The latter originate from the fact that the direction of application of pressure exerted by the knife-edge 1 on the plates 2, 3, 4 and 5 may not coincide exactly with the axes of the stems 6, 7, 8 and 9.

In cases where the stems are not exactly perpendicular to the knife-edge, they will bend a little, thus resulting in the knife-edge 1 continuing to rest evenly on all of the plates 2 to 4.

There are decided advantages of the construction of the invention in comparison with a solid V-bearing in that a solid-V-bearing has the knife-edge, which may be considered as a cylinder, resting upon one of the two slopes of the trough which are interconnected by a more or less cylindrical-shaped area of transition. Very minute lateral displacements of the knife-edge will cause minute changes in the axis of rotation of the part (pendulum or lever) which is supported by the knife-edge.

In the construction, according to the present invention, the area of transition between the two slopes of the V-trough does not exist having regard to the fact that the axis of rotation of the moving part, which is supported by the knife-edge, is fixed relative to the moving part.

When the knife-edge rotates, it rolls over the surfaces of the bearing plates and, consequently, the wires on which the plates are mounted bend slightly as a result of the rotative movement of the knife-edge. Occasional shocks are absorbed in the knife-edge bearing.

The device of the invention provides for positive, yet sensitive, operation. It may be made inexpensively, is easy to assemble, is out of the way with respect to the other operating parts of the weighing apparatus, and is not likely to get out of order.

Changes may be made in the form, construction and arrangement of the parts without departing from the spirit of the invention or sacrificing any of its advantages, and the right is hereby reserved to make all such changes as fall fairly within the scope of the following claims.

I claim:

1. A knife-edge bearing for a measuring instrument, such as a weighing scale, comprising a knife-edge member, a plurality of independently movable knife-edge supporting means to support said knife-edge member, each of said knife-edge supporting means including supporting surfaces occupying a plane tangent to said knife-edge member, said surfaces being disposed pairwise at different angles so that an essentially V-shaped trough is formed, each of said supporting means comprising a stem perpendicular to the tangent plane with the knife-edge member and located on the side of the supporting means remote from the knife-edge member so that a compressive force is exerted thereon, said stems each possessing such a ratio between length and diameter that the supporting means are relatively free to adjust themselves in all directions.

2. A knife-edge bearing for a measuring instrument, such as a weighing scale, comprising a knife-edge member, a plurality of independently movable knife-edge supporting means to support said knife-edge member, each of said knife-edge supporting means including supporting surfaces occupying a plane tangent to said knife-edge member, said surfaces being disposed pairwise at different angles so that an essentially V-shaped trough is formed, a base below the trough and supporting said supporting means, a plurality of stems, each stem having its upper end secured to a supporting means and its lower end fastened to said base, each stem being perpendicular to the tangent plane with the knife-edge member and located on the side of the supporting means remote from the knife-edge member so that a compressive force is exerted thereon, said stems each possessing such a ratio between length and diameter that the supporting means are relatively free to adjust themselves in all directions.

3. A knife-edge bearing for a measuring instrument, such as a weighing scale, comprising an upper knife-edge member, a plurality of independently movable knife-edge supporting means below the knife-edge member to support said knife-edge member, each of said knife-edge supporting means including supporting surfaces occupying a plane tangent to said knife-edge member, said surfaces being disposed pairwise at different angles so that an essentially V-shaped trough is formed, a flexible stem supporting the bottom of each supporting means, the upper end being secured to said surfaces, a base receiving the lower end of each stem, each stem being perpendicular to the tangent plane with the knife-edge member and located on the side of the supporting means remote from the knife-edge member so that a compressive force is exerted thereon, said stems each possessing such a ratio between length and diameter that the supporting means are relatively free to adjust themselves in all directions.

4. A knife-edge bearing according to claim 1, characterized in that each stem comprises a length of piano wire.

5. A device according to claim 4, the special characteristic of which is that each stem consists in a length of piano wire rigidly attached at the opposite ends thereof to each supporting means and to the base.

6. A knife-edge bearing for a measuring instrument comprising, a knife-edge member, a plurality of knife-edge supporting means for supporting said knife-edge member, each of said knife-edge supporting means including supporting surfaces occupying a plane tangent to said knife-edge member, said surfaces being disposed in pairs at different angles so that a substantially V-shaped trough is formed, a base below the trough, and yieldable means extending from said base for supporting each knife-edge supporting means.

7. A knife-edge bearing for a measuring instrument comprising, a knife-edge member, a plurality of knife-edge supporting means for supporting said knife-edge member, each of said knife-edge supporting means including supporting surfaces occupying a plane tangent to said knife-edge member, said surfaces being disposed in pairs at different angles so that a substantially V-shaped trough is formed, a base below the trough, and yieldable means extending from said base for supporting each knife-edge supporting means, said yieldable means extending perpendicular to the tangent plane with the knife-edge member and located on the side of the supporting means remote from the knife-edge member and possessing such characteristics that the supporting means are relatively free to adjust themselves in all directions.

References Cited in the file of this patent

UNITED STATES PATENTS

| | | |
|---|---|---|
| 600,021 | Richards | Mar. 1, 1898 |
| 849,418 | Nickerson | Apr. 9, 1907 |
| 1,981,105 | Hieber | Nov. 20, 1934 |
| 2,676,224 | Stephenson | Apr. 20, 1954 |